United States Patent
Reinders

(10) Patent No.: US 6,904,962 B2
(45) Date of Patent: Jun. 14, 2005

(54) ENTHALPY EXCHANGER

(75) Inventor: Johannes Antonius Maria Reinders, Warnsveld (NL)

(73) Assignee: Oxycell Holding B.V., Raalte (NL)

( * ) Notice: Subject to any disclaimer, the term of this patent is extended or adjusted under 35 U.S.C. 154(b) by 0 days.

(21) Appl. No.: 10/774,459

(22) Filed: Feb. 10, 2004

(65) Prior Publication Data

US 2004/0226698 A1 Nov. 18, 2004

Related U.S. Application Data

(63) Continuation-in-part of application No. PCT/NL02/00539, filed on Aug. 9, 2002.

(30) Foreign Application Priority Data

Aug. 10, 2001 (NL) .............................. 1018735

(51) Int. Cl.⁷ ................................. F28F 19/02
(52) U.S. Cl. ....................... 165/133; 165/166
(58) Field of Search ................ 165/133, 166, 165/4, 10, 167; 55/524, 391, 408, 392.1, 393

(56) References Cited

U.S. PATENT DOCUMENTS

| | | | |
|---|---|---|---|
| 3,296,773 A | | 1/1967 | Hemstreet |
| 3,799,045 A | * | 3/1974 | Sohlberg ................. 454/241 |
| 3,925,021 A | * | 12/1975 | Yoshino et al. ............ 96/118 |
| 4,035,172 A | | 7/1977 | Strindehag et al. |
| 4,231,975 A | | 11/1980 | Peltier |
| 4,503,907 A | * | 3/1985 | Tanaka et al. ............. 165/133 |
| 4,769,053 A | | 9/1988 | Fischer, Jr. |
| 4,875,520 A | | 10/1989 | Steel et al. |
| 5,194,414 A | | 3/1993 | Kuma |
| 5,259,701 A | * | 11/1993 | Gerhart et al. ............. 405/216 |
| 5,315,843 A | | 5/1994 | Mozorov et al. |
| 5,565,139 A | | 10/1996 | Walker et al. |
| 5,722,251 A | | 3/1998 | Nabiulin et al. |
| 5,919,406 A | * | 7/1999 | Bachofen ................... 261/153 |
| 6,145,588 A | * | 11/2000 | Martin et al. ............. 165/166 |
| 6,228,506 B1 | | 5/2001 | Hosatte et al. |
| 6,235,219 B1 | | 5/2001 | Beckenhauer |

FOREIGN PATENT DOCUMENTS

| | | | | |
|---|---|---|---|---|
| GB | 2 165342 A | | 4/1996 | |
| JP | 57-115696 | * | 7/1982 | ................ 165/133 |
| JP | 57-207795 | * | 12/1982 | ................ 165/133 |
| JP | 58-178188 | * | 10/1983 | ................ 165/166 |
| JP | 63 319020 A | | 12/1988 | |

* cited by examiner

Primary Examiner—Terrell Mckinnon
(74) Attorney, Agent, or Firm—Howrey LLP; Jacobus C. Rasser; David P. Owen

(57) ABSTRACT

An enthalpy exchanger is disclosed having a heat conducting wall along both sides of which two respective media can flow in mutual enthalpy-exchanging contact. The wall is provided on at least one side with a hydrophilic cover layer having little or no hygroscopic action. The cover layer may serve to absorb and retain a limited amount of moisture for evaporation into the media.

14 Claims, 1 Drawing Sheet

ENTHALPY EXCHANGER

CROSS REFERENCE TO RELATED APPLICATIONS

This application is a continuation in part of international application No. PCT/NL02/00539, which was published in English under PCT Article 21(2) as WO 03/082442 A1 the content of which is hereby incorporated by reference in its entirety.

BACKGROUND OF THE INVENTION

1. Field of the Invention

The invention relates generally to enthalpy exchangers and more particularly to an enthalpy exchanger comprising a heat-conducting wall along both sides of which two respective media can flow whereby heat may be transferred from one medium to the other through the wall.

2. Description of the Related Art

Enthalpy exchangers are known in which the heat-conducting wall is provided with a cover layer. This cover layer can fulfill one or more of the following functions: protecting against corrosion and/or erosion of each relevant surface; improvement of the thermal resistance; improvement of the appearance; improvement of impact resistance, for instance susceptibility to degradation as a result of loose chippings; improvement of the chemical and/or biochemical resistance of each relevant surface; changing frictional resistance and/or flow resistance; moisture absorption and/or evaporation.

Japanese Patent No JP63 319020 discloses a hygroscopic element having plural air penetrating passages. The element is dipped in a slurry consisting of a hygroscopic salt, silica gel, cement and other components. The resulting product is said to have excellent hygroscopic characteristics.

Another enthalpy exchanger described in U.S. Pat. No. 6,228,506 consists of a cellulose based substrate impregnated with a polymeric desiccant. A further vapor extraction apparatus is known from U.S. Pat. No. 5,565,139, which includes a gel sorbent capable of absorbing vapor directly into the liquid state. Prior art devices using hygroscopic materials have been found to exhibit excessive affinity to the absorbed water. Particularly for use in evaporative cooling devices, such affinity to water has been found to reduce the ability of the cooling device to operate efficiently. Furthermore, enthalpy exchangers produced by dipping into a slurry have been found to function ineffectively under certain conditions since the coating is applied non-selectively to all surfaces.

Use has also been made of other materials for the cover layer. Such materials include organic materials, inorganic materials, synthetic materials in the form of monomers and/or polymers, ceramic materials, metallic materials and hybrid materials. In the prior art the morphology of the cover layers, i.e. the internal microstructure and macrostructure may be continuous or discrete (particles); it may include a binder; it may be formed with capillary interstitial spaces for absorbing water; it may be hygroscopic, hydrophilic, hydrophobic; of varying thicknesses; or be formed of woven or non-woven material or filamentary materials.

Prior art cover layers have been found to exhibit various undesirable and uncontrollable side effects. These include in particular: an uncontrolled increase in thermal resistance, which is undesirable with respect to the necessary heat transfer; vulnerability to erosion and corrosion; susceptibility to diverse forms of degradation; inadequate adhesion, whereby the lifespan of the product is reduced; susceptibility to growth of micro-organisms; and susceptibility to build-up of dirt. In addition, existing layers, even with a limited controllability of desired properties, can only be applied by relatively costly production processes.

There is thus a need for a heat exchanger having a heat-conducting wall provided with a cover layer having controllable and homogeneous properties.

There is furthermore a particular need for a heat exchanger having a heat-conducting wall that is able to retain moisture in a cover layer of the heat-conducting wall and yet is able to operate efficiently as an evaporative cooler with relatively low resistance to heat-conduction across the cover layer.

BRIEF SUMMARY OF THE INVENTION

The present invention addresses these problems by providing an enthalpy exchanger, comprising a heat-conducting wall along both sides of which two respective media can flow in mutual enthalpy-exchanging contact, the wall being provided with a hydrophilic cover layer having little or no hygroscopic action.

In a preferred embodiment the enthalpy exchanger is incorporated in an evaporative cooler. The hydrophilic cover layer is designed to readily absorb water presented to it in its liquid state, and to readily desorb absorbed water through evaporation. For this purpose the hydrophilic cover layer should not tend to retain absorbed water under evaporative conditions (i.e., when exposed to a gas flow that is not saturated with moisture) and should not absorb moisture from the gas phase. In other words, the layer should have little or no hygroscopic action.

According to preferred embodiments of the invention, the cover layer may exhibit one or more properties selected from the group consisting of: (a) a strong adhesion to each relevant surface; (b) a substantially complete covering of each relevant surface; (c) a maximum thickness of 50 micrometers; (d) a heat resistance which is small relative to the total heat resistance in the enthalpy transfer path between the relevant surface and the flowing medium; (e) a moisture absorption capacity such that water absorbed during wetting spreads as a film over the cover layer; (f) little surface roughness such that flowing medium encounters only a negligible flow resistance; (g) little susceptibility to thermal, chemical and biochemical degradation, erosion, growth of micro organisms and adhesion of dirt; (h) morphological, chemical and physical uniformity; (i) the ability to retain a buffer supply of water which is absorbed in the cover layer by capillary action.

A particularly advantageous embodiment has the special feature that the cover layer contains Portland cement, preferably with micro grain, wherein water storage and water transport is possible with little resistance in the interstitial spaces. In this latter embodiment the enthalpy exchanger can have the special feature that the activation of each relevant surface to be coated, during production has taken place by degreasing, mechanical blasting, etching and/or priming. The cover layer can meet set requirements. Use can be made for this purpose of said activation. The layer thickness can further be controlled for instance by electrostatic metering and application, reducing the grain size, controlling the moisture balance during curing and thermal regulation of the curing speed. Regulation of the capillary structure and the possibility of moisture storage can further be realized by controlling the grain size. It is particularly advantageous that the cover layer may be selectively applied e.g. by spraying, only to those areas of the heat exchanging wall where a coating is required.

In one preferred embodiment, the cover layer may be applied by chemical means by first activating each relevant surface physically, chemically or mechanically and subsequently forming the cover layer by, for example, a chemical reaction from an aqueous solution.

In a particular embodiment of enthalpy exchanger the heat-conducting wall is provided with surface area-enlarging means to increase the effective surface area available for heat transfer. The surface area enlarging means may be fins or the like and may further be provided with louvers or other such elements. The surface area enlarging means may itself be provided by the surface roughness of the cover layer and e.g. interstitial spaces in a porous surface thereof.

According to a particularly advantageous aspect of the invention there is provided an indirect evaporative cooler comprising a heat-conducting wall having a primary surface for heat exchange with a primary air flow and a secondary surface for heat exchange with a secondary air flow, the secondary surface being provided with a hydrophilic cover layer having little or no hygroscopic action.

Preferably the indirect evaporative cooler has a cover layer comprising Portland cement; in particular the cover layer may be formed entirely of Portland cement.

In order to ensure effective operation to temperatures below the wet bulb temperature, the indirect evaporative cooler may further comprise a flow separating device for directing a portion of the primary air flow over the secondary surface to form the secondary air flow.

Preferably the indirect evaporative cooler further comprises a wetting device for supplying a quantity of water to the cover layer. The water may be supplied in a controlled manner, preferably intermittently and avoiding nebulization of the water into the secondary air flow.

It has been found particularly important that the thermal resistance of the cover layer is as low as possible to avoid a significant reduction in the total heat transfer. To this end, the cover layer should be as thin as possible within the limits of its liquid buffering function, preferably with a thickness of less than 50 micrometers.

BRIEF DESCRIPTION OF THE DRAWINGS

The features and advantages of one embodiment of the invention will be appreciated upon reference to the following exemplary drawing, in which.

DESCRIPTION OF ILLUSTRATIVE EMBODIMENTS

Figure 1:
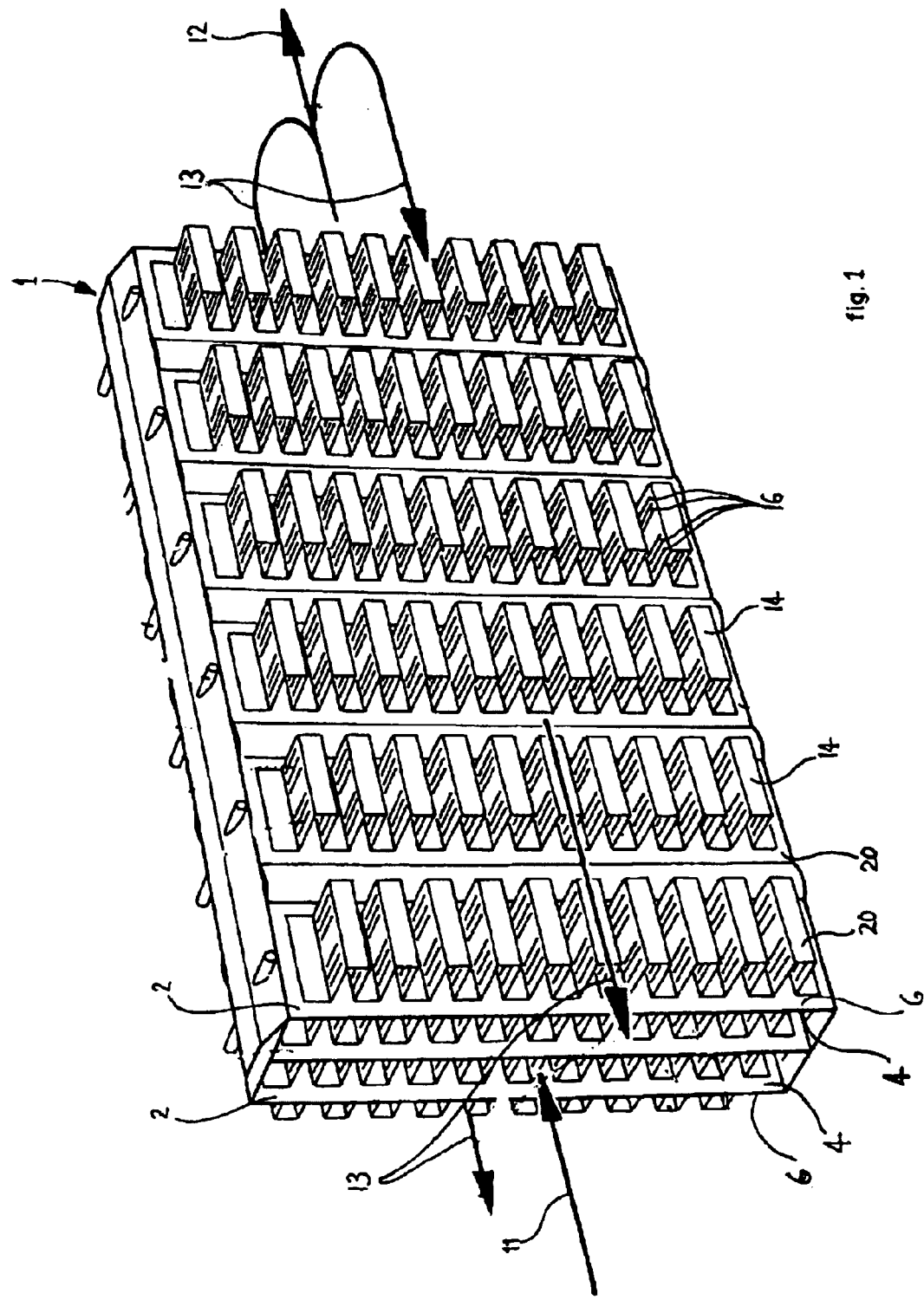
FIG. 1 is a perspective view of an enthalpy exchanger according to the present invention.

FIG. 1 shows an enthalpy exchanger 1 according to the present invention. The enthalpy exchanger may be of the type disclosed in copending PCT application No NL03/00153 the contents of which are herewith incorporated by reference in their entirety.

The enthalpy exchanger 1 comprises a pair of walls 2. Each wall 2 has a primary surface 4 and an opposing secondary surface 6. The walls 2 are joined together at their top and bottom edges to form a tubular structure through which an air flow 11 may pass. The walls 2 are formed of a thin metal foil. Aluminum foil has been found most suitable but other metal foils may also be used. Alternatively, a thin membrane of plastic material may be used.

As can be seen from FIG. 1, both surfaces 4, 6 are generally covered with fins 14. The fins 14 are formed as corrugated strips generally aligned with the flow. The strips are preferably formed of aluminum, copper or other material with good heat transmitting properties. They may be glued, welded or otherwise sealed to the wall 2 to ensure good heat transmission through the wall 2 to the fins 14 on the opposing surface of the wall. The fins 14 are further provided with louvers 16.

According to one aspect of the present invention, the secondary surface 6 of the wall 2 is covered with a cover layer 20 of Portland cement having a thickness of about 40 micrometers. The cover layer 20 is also applied to the outer surface of those fins 14 on the secondary surface 6. Portland cement is a mixture consisting predominantly of calcium silicates, which reacts with water to form a hard mass. Although reference is made in the present specification to Portland cement, other similar substances having equivalent properties may also be employed and reference in the following to Portland cement is intended to include such substances. The cover layer 20 is preferably applied by spraying the partially finished enthalpy exchanger 1 with a slurry of the cement in water. The slurry may also comprise further additives to improve its properties, including adhesion improvers, anti-clogging additives, set-retarding additives and the like as known to the skilled person in this field.

It has been found that by spraying the slurry onto the enthalpy exchanger, only the fins 14 on the secondary surface 6 are coated by the cover layer 20 and only on their outer surfaces i.e. the exterior surface facing away from the secondary surface 6. Areas of the secondary surface 6 beneath the fins are also left uncoated. This partial coating of the secondary surface 6 and fins 14 has been found extremely advantageous for use in an indirect evaporative cooler. When used in this way, water provided to the secondary surface 6 wets and is retained by those coated areas and can be evaporated into a secondary air flow 13 passing over the surface. Latent heat is thus transferred from the wall 2 to the secondary air flow 13. The remaining uncoated areas provide direct thermal heat transfer from the wall 2 to the secondary air flow 13. This balance between thermal and latent heat has been found to be of vital importance in achieving effective cooling. A ratio of about 50% uncoated surface on the secondary side 6 has been found desirable in most climates although in hot dry climates, a greater coated area may be desirable.

For use as an indirect evaporative cooler, it has been found that the air flow 11 passing over the primary surface 4 of the enthalpy exchanger 1 should be split and partially returned over the secondary surface 6. According to a further aspect of the invention there may be provided a flow separating device (not shown) to split the flow 11 into a secondary air flow 13 and a product air flow 12. The product air flow 12 may be provided e.g. to a living space for cooling purposes while the secondary air flow 13 may be exhausted to ambient.

According to alternative aspects of the invention the cover layer 20 may consist of organic material. This variant can for instance have the feature that the material contains an acryl and/or an amide.

The enthalpy exchanger 1 can meet set requirements if the following measures are taken:

choosing and adjusting the hydrophilic properties of the cover layer.

Preferably the cover layer should be non-hygroscopic. It has been found however that a slight hygroscopic action may be desirable to prevent the cover layer drying out completely. Wetting of a slightly moist substrate has been found to take place more quickly and effectively than one which is dry. For an acryl/amide cover layer, the hydrophilic properties may be adjusted e.g. by choosing the ratio of acryl and amide. Account has to be taken here of the generally hydrophilic character of acryl, while an amide is generally not particularly hydrophilic unless it is modified;

activating each relevant surface during production by exposure to a plasma;

improving the thermal resistance by selection of basic monomer and polymer groups, chain lengths and the like in relation to the curing process;

improving the formation of a water film by increasing the content of hydrophilic additives;

improving the resistance to micro-organisms by increasing molecule chain lengths.

In yet another embodiment the enthalpy exchanger has the special feature that the cover layer consists of an alkali metal silicate, for instance a sodium silicate or a potassium silicate. This embodiment can have the special feature that the activation of each relevant surface during production has taken place by exposure to a plasma, degreasing, etching, anodizing and/or mechanical blasting.

An enthalpy exchanger of this latter type can meet set requirements by applying the following measures:

choosing and adjusting the hydrophilic properties of the cover layer for water film formation by adjusting the solution strength of silicon dioxide and thereby adjusting the layer thickness (from several micrometers to in the order of 20–40 micrometers). The thermal resistance of such a cover layer is excellent and generally requires no special attention;

improving the water film formation by increasing the content of hydrophilic additives (for instance metal salts). As a result of the chemical composition the resistance of this layer to micro-organisms is already excellent and requires no further special attention.

The adhesion of the cover layer to each relevant surface can be excellent in an embodiment wherein the activation of each relevant surface during production has taken place by exposure to a plasma, degreasing, etching, anodizing and/or mechanical blasting.

The silicate cover layer is suitable for applying to surfaces of the most diverse materials, for instance metals, ceramic materials and plastic, in particular PVC. In the case stainless steel is used, the activation of the surface can take place by etching with sulphuric acid and chromic acid, followed by rinsing and drying. In the case of copper, etching can take place effectively by making use of sulphuric acid followed by rinsing and drying. The cover layer is then applied from an aqueous solution of sodium hydroxide or potassium hydroxide with silicon dioxide.

It will be apparent from the foregoing that the invention provides an enthalpy exchanger with a cover layer, the properties of which can be very well controlled for the most diverse applications and designs of the enthalpy exchanger.

Many modifications in addition to those described above may be made to the structures and techniques described herein without departing from the spirit and scope of the invention. Accordingly, although specific embodiments have been described, these are examples only and are not limiting upon the scope of the invention.

What is claimed is:

1. An enthalpy exchanger, comprising a heat conducting wall along both sides of which two respective media can flow in mutual enthalpy-exchanging contact, the wall being provided on at least one side with a hydrophilic cover layer having little or no hygroscopic action, the hydrophilic cover layer comprising Portland cement.

2. The enthalpy exchanger according to claim 1, wherein the cover layer has a thickness of less than about 50 micrometers.

3. The enthalpy exchanger according to claim 1, wherein the cover layer is applied to relevant surfaces of the wall by chemical means by first activating each relevant surface physically, chemically or mechanically and subsequently forming the cover layer by, a chemical reaction from an aqueous solution.

4. The enthalpy exchanger according to claim 1, wherein the heat conducting wall is provided with surface area enlarging elements.

5. The enthalpy exchanger according to claim 4, wherein the surface area enlarging elements are fins or the like.

6. An indirect evaporative cooler comprising a heat conducting wall having a primary surface for heat exchange with a primary air flow and a secondary surface for heat exchange with a secondary air flow the secondary surface being provided with a hydrophilic cover layer having little or no hygroscopic action, the hydrophilic cover layer comprising Portland cement.

7. The indirect evaporative cooler according to claim 6, further comprising a flow separating device for directing a portion of the primary air flow over the secondary surface to form the secondary air flow.

8. The indirect evaporative cooler according to claim 7, further comprising a wetting device for supplying a quantity of water to the cover layer.

9. The indirect evaporative cooler according to claim 8, wherein the heat-conducting wall is provided with surface area enlarging elements.

10. The indirect evaporative cooler according to claim 9, wherein the surface area enlarging elements are fins.

11. The indirect evaporative cooler according to claim 10, wherein the surface area enlarging elements on the secondary surface of the heat exchanger are partially coated with the cover layer.

12. The indirect evaporative cooler according to claim 6, wherein the cover layer is selectively applied to the wall by spraying onto selected surface areas.

13. The indirect evaporative cooler according to claim 7, wherein the cover layer has a thickness of less than 50 micrometers.

14. An enthalpy exchanger, comprising a heat conducting wall along both sides of which two respective media can flow in mutual enthalpy-exchanging contact, the wall being provided on at least one side with a hydrophilic cover layer having little or no hygroscopic action, the cover layer comprising Portland cement and exhibiting one or more properties selected from the group consisting of:

(a) a strong adhesion to each relevant surface;

(b) a substantially complete covering of each relevant surface;

(c) a maximum thickness of 50 micrometers;

(d) a heat resistance which is small relative to the total heat resistance in the enthalpy transfer path between the relevant surface and the flowing medium;

(e) a moisture absorption capacity such that water absorbed during wetting spreads as a film over the cover layer;

(f) little surface roughness such that flowing medium encounters only a negligible flow resistance;

(g) little susceptibility to thermal, chemical and biochemical degradation, erosion, growth of micro organisms and adhesion of dirt;

(h) morphological, chemical and physical uniformity;

(i) the ability to retain a buffer supply of water which is absorbed in the cover layer by capillary action.

* * * * *